(12) United States Patent
Cromer et al.

(10) Patent No.: US 7,330,977 B2
(45) Date of Patent: Feb. 12, 2008

(54) APPARATUS, SYSTEM, AND METHOD FOR SECURE MASS STORAGE BACKUP

(75) Inventors: Daryl Carvis Cromer, Apex, NC (US); Howard Jeffrey Locker, Cary, NC (US); Randall Scott Springfield, Chapel Hill, NC (US)

(73) Assignee: Lenovo Pte Ltd, Central 1, Singapore (SG)

( * ) Notice: Subject to any disclaimer, the term of this patent is extended or adjusted under 35 U.S.C. 154(b) by 834 days.

(21) Appl. No.: 10/748,062

(22) Filed: Dec. 30, 2003

(65) Prior Publication Data

US 2005/0144443 A1 Jun. 30, 2005

(51) Int. Cl.
*H04L 9/00* (2006.01)
(52) U.S. Cl. .................. 713/189; 713/191; 713/193
(58) Field of Classification Search ............ 713/193, 713/189, 191
See application file for complete search history.

(56) References Cited

U.S. PATENT DOCUMENTS

| | | | |
|---|---|---|---|
| 5,033,000 A | 7/1991 | Littlejohn et al. | 364/424.05 |
| 5,226,137 A | 7/1993 | Bolan et al. | 395/425 |
| 5,469,564 A | 11/1995 | Junya | 395/188.01 |
| 6,012,146 A | 1/2000 | Liebenow | 713/202 |
| 7,111,175 B2 * | 9/2006 | Ripley | 713/193 |
| 7,124,317 B2 * | 10/2006 | Yoshino et al. | 714/6 |
| 7,216,369 B2 * | 5/2007 | Wiseman et al. | 726/34 |
| 2001/0003517 A1 * | 6/2001 | Nonaka et al. | 369/47.12 |

OTHER PUBLICATIONS

Second Copy 2000 makes backup operations a breeze, by Centered Systems Nov. 1999.*

* cited by examiner

*Primary Examiner*—Ellen Tran
(74) *Attorney, Agent, or Firm*—Kunzler & McKenzie (57) ABSTRACT

An apparatus for securely backing up data using a cryptographic module includes a mass storage device having a first accessible portion and a second encrypted portion. The mass storage device is initialized to only decrypt the encrypted portion on the system that first created the encrypted portion. The cryptographic module may be a Trusted Platform Module (TPM) based on specifications from the Trusted Computer Group. The mass storage device comprises a trusted platform interface module configured to communicate with the TPM. The system may include a motherboard having a TPM, and the mass storage device. The method in one embodiment comprises providing a computer readable mass storage device, initializing a password module, transmitting an encrypted password to the cryptographic module, authenticating the encrypted password, decrypting the encrypted password, transmitting the decrypted password to the computer readable medium, and decrypting the second encrypted portion using the decrypted password.

24 Claims, 6 Drawing Sheets

APPARATUS, SYSTEM, AND METHOD FOR SECURE MASS STORAGE BACKUP

BACKGROUND OF THE INVENTION

1. Field of the Invention

The present invention relates to the field of trusted and secure computing systems, and more particularly to securely backing up and restoring data using mass storage devices.

2. Description of the Related Art

With the advent of computer systems, there has always existed a need to transport, backup, or restore data. In the 1960's, IBM invented the forerunner of current removable media, the floppy disk. At first, the floppy disk was a read only disk with a large eight-inch form factor. Eventually, the floppy disk was adapted to be writable as well as readable, and the form factor shrunk to the common day 3-½ inch form factor. The floppy disk was a popular choice for removable media because of portability and cost. However, the floppy disk was never popular for backing up and restoring data due to the small data capacity (approximately 1.4 MB).

In order to transport or backup and restore any significant amount of data, a storage device other than a floppy disk is needed. One such device that offers higher data capacities is a tape drive. The tape drive, like the floppy disk, is an electromagnetic storage device that can store many gigabytes, even terabytes, of data. The tape drive is an ideal solution for corporations, but for the individual business or home user the tape drive is not practical. This is due in part to the hardware required to utilize a tape drive. Alternatively, many have turned to optical disks such as CD's or DVD's to store data. Optical disks offer large data capacities, currently ranging from 700 MB to 8.7 GB, and optical disks offer portability. However, just as with the tape drive, optical disks require specialized hardware in order to write data to the disk.

An alternative solution to backing up and restoring data is a flash memory based Universal Serial Bus (USB) drive. USB drives are commonly known as USB mass storage devices, and are available in many different form factors. A popular form factor is the keychain drive. These devices are small, often one to two inches in length, highly portable and currently have data capacities of up to 2 GB. Since desktop and portable computers generally have multiple USB ports, no proprietary hardware is required to use a USB drive.

All of the above discussed removable media are viable solutions depending upon the situation. However, with the portability of removable media comes the increased risk of losing the storage device that may contain highly sensitive data. While many removable media manufacturers have made individual strides towards increasing security by adding "smart cards" or embedded security chips to their new models, the lack of a concerted effort by the removable media industry to develop security technology could prevent the evolution of this technology in a consistent and compatible way between manufacturers.

One current solution to this problem is to password encrypt the data on the removable media device. The password, however, does not prevent the removable media device, such as a USB drive, to be used in multiple systems. For example, assume a business traveler loses a USB drive in the airport, and a person retrieves the USB drive. Commonly available password breaking tools will allow a person to potentially retrieve the data from the USB drive. Additionally, people may forget passwords, and then the data becomes lost in the sense that a person may never be able to access the encrypted data again. What is needed is a system, method, and apparatus that only allows data stored on removable media to be accessed on the system that created the data, and thereby negates the need of user-interaction.

An open alliance between major manufacturers was formed to develop and propose a standard that would adopt hardware and software technologies to strengthen security at the system or platform level. The open alliance, formerly known as the Trusted Computing Platform Alliance (TCPA) (currently referred to as the Trusted Computing Group (TCG) but will be referred to herein as the TCPA), has proposed a standard including new hardware, BIOS and operating system specifications so manufacturers can provide a more trusted and secure PC platform based on common industry standards, the details of which are provided in the TCPA PC Specific Implementation Specification, 1.00 RC1 (Aug. 16, 2001) (http://www.trustedcomputinggroup.org), hereby incorporated by reference.

The alliance has successfully created a cryptographic module generally called a Trusted Platform Module (TPM). However, no method or apparatus exists to interface removable media devices with the TPM in order to take advantage of the cryptographic capabilities of the TPM. What are needed is a process, apparatus, and system that interface a removable media storage device with the TPM. Beneficially, such a process, apparatus, and system would allow secure backup and restore of data only on the system that created the data.

SUMMARY OF THE INVENTION

The present invention has been developed in response to the present state of the art, and in particular, in response to the problems and needs in the art that have not yet been fully solved by currently available removable media devices. Accordingly, the present invention has been developed to provide a process, apparatus, and system for secure mass storage backup and restore that overcome many or all of the above-discussed shortcomings in the art.

An apparatus for secure computer readable mass storage backup is provided. In one embodiment, the apparatus may comprise a computer readable mass storage device having at least a first accessible portion and a second encrypted portion, and a trusted platform interface module operatively coupled with the computer readable medium and configured to communicate with a cryptographic module. The cryptographic module may comprise a trusted platform module (TPM). The computer readable mass storage device may be implemented as a computer readable peripheral such as a hard disk drive, a universal serial bus storage device, a floppy disk, an optical storage disk, a flash memory storage device, or a network attached storage drive.

Additionally, the apparatus comprises a password module configured to store and transmit an encrypted password to the cryptographic module, and receive an unencrypted password from the cryptographic module. In one embodiment, the encrypted password comprises a unique password configured to be decrypted by the cryptographic module that first created the encrypted password. In a further embodiment, the apparatus further comprises a backup utility configured to selectively copy data from a storage device source, detect newer versions of data stored on the storage device source, and replace older versions of the data on the computer readable medium with newer versions of the data.

The present invention may also comprise a device for secure computer readable medium backup. In one embodiment, the device comprises a motherboard, and a cryptographic module coupled to the motherboard and configured to communicate with a computer readable medium. Additionally, the cryptographic module may be configured to receive an encrypted password from a trusted platform interface module, decrypt the password, and transmit the decrypted password to the trusted platform interface module. In a further embodiment, the motherboard further comprises a memory, and a processor coupled to the memory.

A system for secure computer readable medium backup is also provided. In one embodiment, the system may comprise a motherboard, a cryptographic module coupled to the motherboard configured to decrypt encrypted passwords, a computer readable medium module having at least a first accessible portion and a second encrypted portion, and a trusted platform interface module operatively coupled with the computer readable media module and configured to communicate with a cryptographic module. The system may also comprise a password module configured to store and transmit an encrypted password to the cryptographic module, and receive an unencrypted password from the cryptographic module.

In a further embodiment of the present invention, a computer readable storage medium comprising computer readable code is provided. The computer readable code may be configured to carry out a method for secure computer readable medium backup. In one embodiment, the method comprises providing a computer readable medium having at least a first accessible portion and a second encrypted portion, initializing a password module according to unique data stored within a cryptographic module, transmitting an encrypted password to the cryptographic module, authenticating the encrypted password, decrypting the encrypted password, transmitting the decrypted password to the computer readable medium module, and decrypting the second encrypted portion using the decrypted password.

An apparatus for secure computer readable medium backup is also provided. The apparatus comprises means for providing a computer readable medium having at least a first accessible portion and a second encrypted portion, means for initializing a password module according to unique data stored within a cryptographic module, means for transmitting an encrypted password to the cryptographic module, means for authenticating the encrypted password, means for decrypting the encrypted password, means for transmitting the decrypted password to the computer readable medium module, and means for decrypting the second encrypted portion using the decrypted password.

A process of the present invention is also presented for secure mass storage backup. The process in the disclosed embodiments substantially includes the steps necessary to carry out the functions presented above with respect to the operation of the described apparatus and system.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

A brief discussion of the boot process of a computing system is deemed appropriate here. Computing systems require a basic input/output system (BIOS) in order to operate. The BIOS is code that controls basic hardware operations, such as interactions with disk drives, hard drives, floppy drives, and the keyboard.

When a computer resets or is initially powered-on, a boot process begins. First, a power on self-test (POST) begins executing. POST is an initialization code which configures the system utilizing initialization settings stored in storage. Once POST has configured the system, BIOS then controls the basic operation of the hardware, utilizing the hardware as it was configured by POST. The boot process is complete once an operating system has been handed control of the system. In order for the boot process to be complete, POST must complete its execution.

POST and BIOS may be both stored as a single flash image in a storage device such as a flash memory. This image may be referred to as the "boot code." If the flash image of POST and BIOS is corrupted, the boot of the system will not be able to be completed.

To recover from a defective flash image error, a system may include a boot block. A boot block may refer to an area within a flash memory containing code, referred to as the "boot block code," which includes a segment of code sufficient to bring the computer system up and to read a recovery image from a boot media or bootable device. In other words, the boot block code may be considered to be a self-contained "miniBIOS" with enough code so as to read the new BIOS image off a boot media or the like. The boot block code may be executed when a computer is powered up or reset. The boot block code may further be executed when a computer is awakened from a sleep state as discussed further below.

Figure 1:
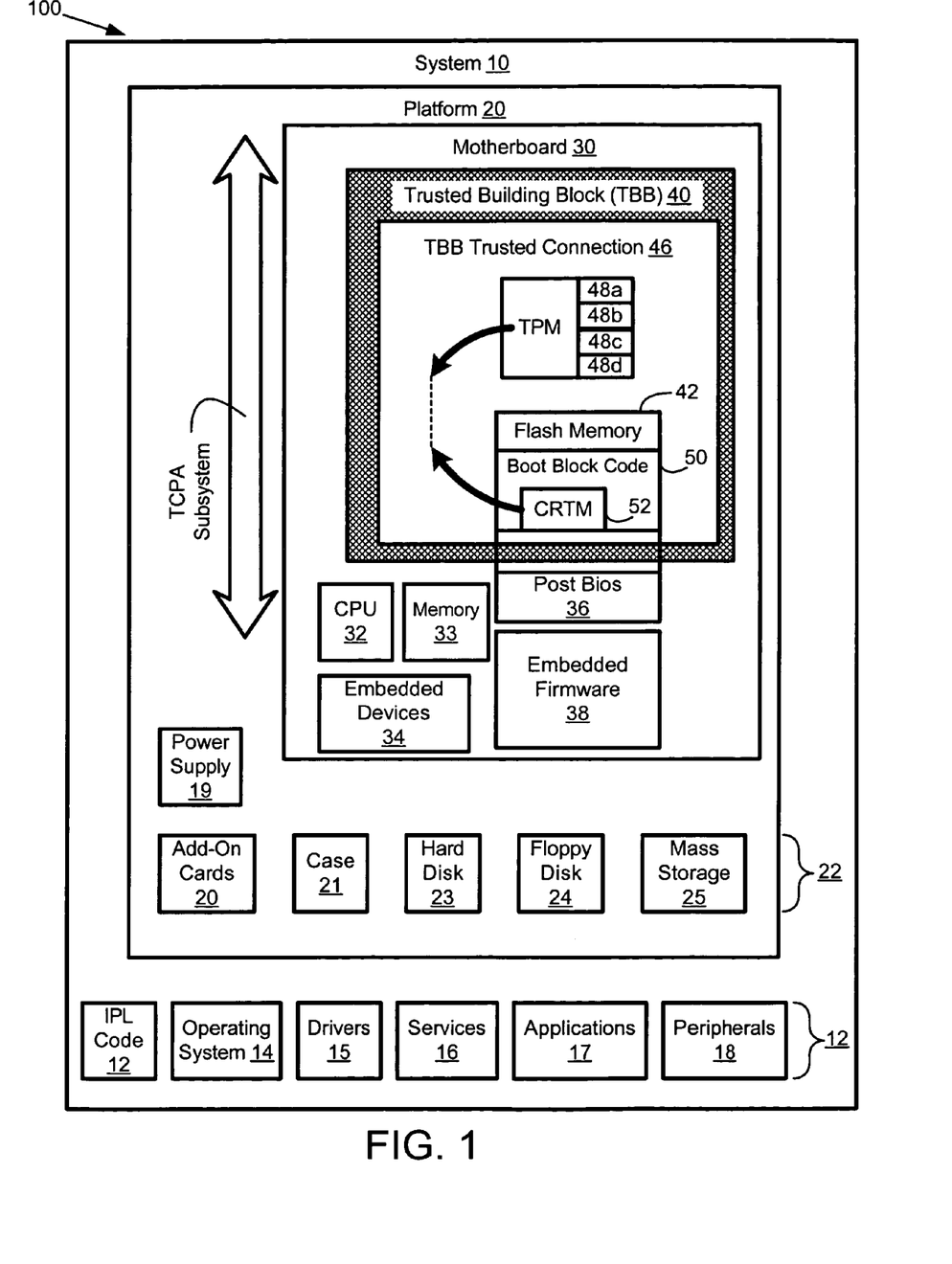
FIG. 1 is a schematic block diagram illustrating one embodiment of a Trusted Computing Platform Alliance (TCPA) based system in accordance with the present invention.

FIG. 1 is a schematic block diagram illustrating a Trusted Computing Platform Alliance (TCPA) computing system 100 in accordance with TCPA standards. As illustrated, the PC architecture includes a system 10, platform 20, motherboard or planar 30, and trusted building block (TBB) 40. The system 10 includes the platform 20 and all post-boot components 12. Post-boot components 12 may include Initial Program Load (IPL) code 13, an operating system 14, drivers 15, services 16, applications 17 and peripherals 18. The platform 20 presents and receives information to and from the user. The platform 20 includes the motherboard 30 and the peripherals 22 attached to the motherboard 30. The peripherals 22 may include add-on cards 20, a case 21, a hard disk 23, a floppy disk 24, and a mass storage device 25. The platform 20 may also comprise a power supply 19.

The motherboard 30 is provided by a manufacturer and includes one or more CPUs 32, a memory 33 and all primary peripheral or embedded devices 34. In addition, the motherboard 30 may comprise a BIOS 36, embedded firmware 38, and a Trusted Building Block (TBB) 40. The TBB 40 is the center of the trusted platform, and includes a portion of a flash memory 42 storing a boot block code 50, which includes a Core Root of Trust for Measurement (CRTM) 52. The TBB 40 further includes a cryptographic module 44. In one embodiment, the cryptographic module 44 comprises a Trusted Platform Module (TPM) 44, and a trusted connection 46 of CRTM 52 and TPM 44 to the motherboard 30.

According to the TCPA specification, CRTM 52 and TPM 44 are the only trusted components on the motherboard 30, i.e., they are presumably secure and isolated from tampering by a third party vendor or software. Only the authorized platform manufacturer (or agent thereof) can update or modify code contained therein. The CRTM 52 is the executable component of the TBB 40 that gains control of the platform 20 upon a platform reset. Thus, for all types of platform resets, the CPU 32 always begins executing CRTM code 52 within boot block code 50. The trust in the platform is based on CRTM 52, and trust in all measurements is based on its integrity.

The basic premise underlying the trusted platform is ensuring that untrusted devices or software have not been loaded onto the system. Trust is established during a pre-boot state that is initiated by a platform reset. The platform reset can either be a cold boot (power-on), a hardware reset, or a warm boot typically caused by a user keyboard input. Following a platform reset, the CPU 32 executes code with CRTM's 52 platform initialization code. The chain of trust begins at CRTM 52.

In this architecture, the BIOS includes boot block code 50 and a POST BIOS 36. Boot block code 50 and POST BIOS 36 are independent components and each may be updated independent of the other. Boot block code 50 is located in a portion of flash memory 42 within TBB 40, while POST BIOS 36 is located in another portion of flash memory 42 outside TBB 40. Thus, while the manufacturer or a third party supplier may update, modify or maintain POST BIOS 36, only the manufacturer can modify or update boot block code 50.

As stated above, the CRTM 52 and the TPM 44 are presumptively trusted. Thus, following a platform reset, the CRTM 52 in boot block code 50 is executed, which measures the entity to which it will transfer control, in this case, Post BIOS 36. "Measuring an entity" means hashing code in the entity to produce a log of the code, which is then extended into a platform configuration register (PCR) 48 in the TPM 44. The TPM 44 may comprise a plurality of PCRs 48 (48*a-d*), a portion of which are designated to the pre-boot environment and referred to collectively as boot PCRs 48. Each boot PCR 48 is dedicated to collecting specific information related to a particular stage of a boot sequence. For example, one boot PCR 48 (PCR[0]) may store measurements from the CRTM 52, the POST BIOS 36, and all firmware 38 physically bound to the motherboard 30.

Once POST BIOS 36 has been measured, control is transferred to the POST BIOS 36, which then continues to boot the system by ensuring that hardware devices are functional. The POST BIOS 36 may move code, referred to herein as "legacy BIOS code," stored in the flash memory 42 within the TBB 40 to memory 33 during the POST operation. The legacy BIOS code may refer to code that provides certain core functions such as keyboard and basic video support. Further, POST BIOS 36 may move code from the flash memory 42 to memory 33 used to support the functions of the legacy BIOS code such as Universal Serial Bus (USB) interface support code for USB operations as well as code used for power management routines, e.g., Advanced Configuration and Power Interface (ACPI) code. These codes may be stored in a different location in the memory address space in memory 33 than the location of the legacy BIOS code.

Further, once the POST BIOS 36 gains control, it is responsible for measuring any entity to which it will transfer control. As the POST BIOS 36 progresses through the boot sequence, values in the boot PCRs 48a change whenever an entity is measured.

Upon booting to the operating system (OS) 14, the operating system 14 verifies the trustworthiness of platform 20 by comparing the values in the boot PCRs 48 with precalculated values known by the operating system 14. If the values match, the operating system 14 is assured of a secure boot and that the platform is trusted. The system 100 may then be available for use. If the values do not match, the operating system 14 is alerted of a possible breach, and the operating system 14 can take measures to reestablish trust. In one embodiment, the operating system 14 may reside within the hard disk 23. Alternatively, the operating system 14 may reside within the mass storage device 25.

Figure 2:
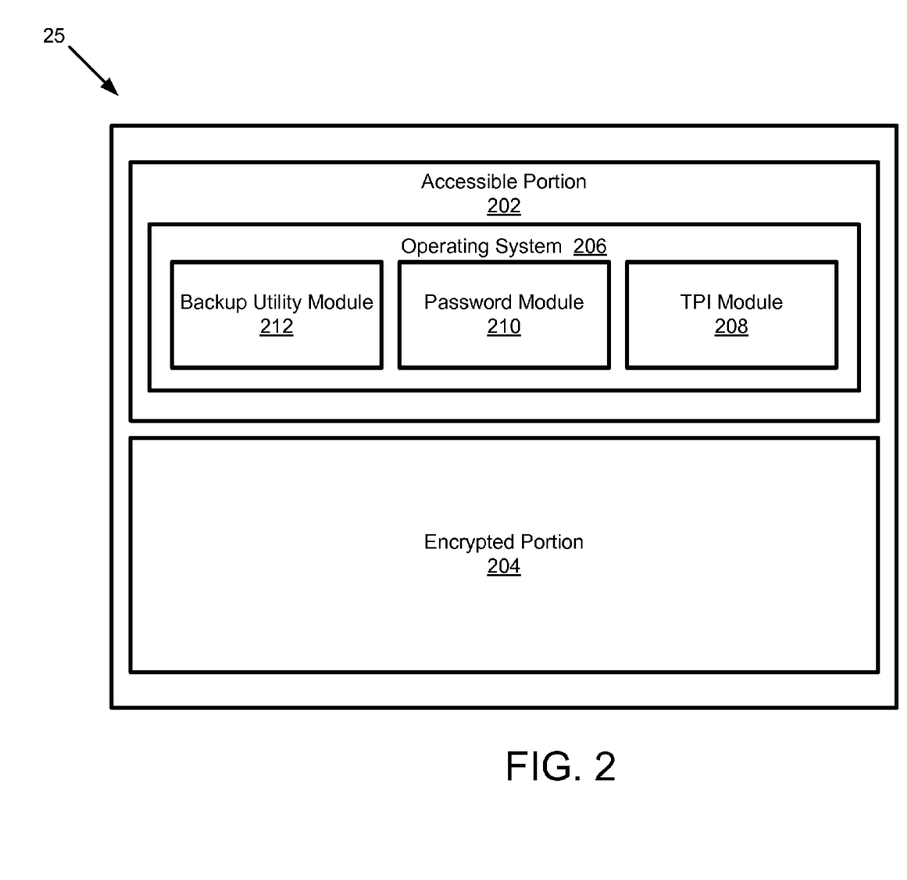
FIG. 2 is a schematic block diagram illustrating one embodiment of a mass storage device in accordance with the present invention.

Referring now to FIG. 2, shown therein is a schematic block diagram illustrating one embodiment of the mass storage device 25 of the present invention. The mass storage device 25 may comprise a USB flash-memory based storage device. The mass storage device 25 may be configured to interface with the motherboard 30. Alternatively, the mass storage device 25 may comprise computer readable media such as, but not limited to, hard disk drives, floppy disks, optical disks, flash memory devices, and tape drives. In one embodiment, the mass storage device 25 comprises an accessible portion 202 and an encrypted portion 204. In one embodiment, the accessible portion 202 and the encrypted portion 204 comprise a first and a second partition on the mass storage device 25. For example, in a common personal computer system, the accessible partition 202 would be represented as "C drive," and the encrypted partition as "D drive." Alternatively, both the accessible portion 202 and the encrypted portion 204 may reside within the same partition of the mass storage device. Alternatively, the encrypted portion 204 can reside in a nonreadable portion of the mass storage device 25. This nonreadable portion can only be "unlocked" or become readable once a correct password is presented to the device. The advantage of this implementation is that the backuped files cannot be corrupted or lost by mistake.

The accessible portion 202 comprises the elements required by the system to complete the boot process as described above. In one embodiment, the accessible portion comprises the operating system 14 of system 10. Alternatively, the accessible portion may comprise an operating system 206 having a trusted platform interface (TPI) module 208, a password module 210, and a backup utility module 212. The mass storage device 25 is configured as a removable media device, recognizable by the motherboard 30. Such removable devices are well known in the art, and therefore do not require further discussion.

Upon booting to the operating system 206, the TPI module 208 interfaces with the TPM 44 of FIG. 1, and verifies the trustworthiness of the platform 20 by comparing values in the boot PCRs 48 with precalculated values known by the TPI module 208. If the values match, the operating system 206 is assured of a secure boot and that the platform 20 is trusted. The known precalculated values are the result of the hash or "measuring of the entity." In one embodiment, the TPI module 208 is configured to trust only the system 10 to which the TPI module 208 first interfaced.

Once booted, the operating system 206 attempts to access the encrypted portion 204. The password module 210 is configured to store an encrypted password (not shown) that will unlock the encrypted portion 204. However, the encrypted password must first be decrypted. Only the TPM 44 that first encrypted the password is able to decrypt the password. The process by which the TPM 44 encrypts and decrypts data is described by the TCPA specification and therefore further discussion is not required. Accordingly, the TPI module 208 may be configured to transmit the encrypted password to the TPM 44. The TPM 44 then authenticates the encrypted password, and if successful, returns a decrypted password to the TPI module 208. The password module 210 then unlocks the encrypted portion 204, and makes the encrypted portion 204 available to the operating system 206.

The backup utility module 212 may be configured to automatically backup data from the system 10. In one embodiment, the backup utility 212 is configured to detect the presence of the hard disk 23 of FIG. 1, and create a copy of the data to be stored within the encrypted portion 204. Alternatively, the copy of the data may be stored in an unaccessible portion of the mass storage device 25. Additionally, the backup utility module 212 may be configured to automatically detect the data that has changed since the previous backup, and only update the changed data. In a further embodiment, the backup utility module 212 is configured to restore data residing within the mass storage device 25 to the hard disk 23 in the event of a system 10 failure.

Figure 3:
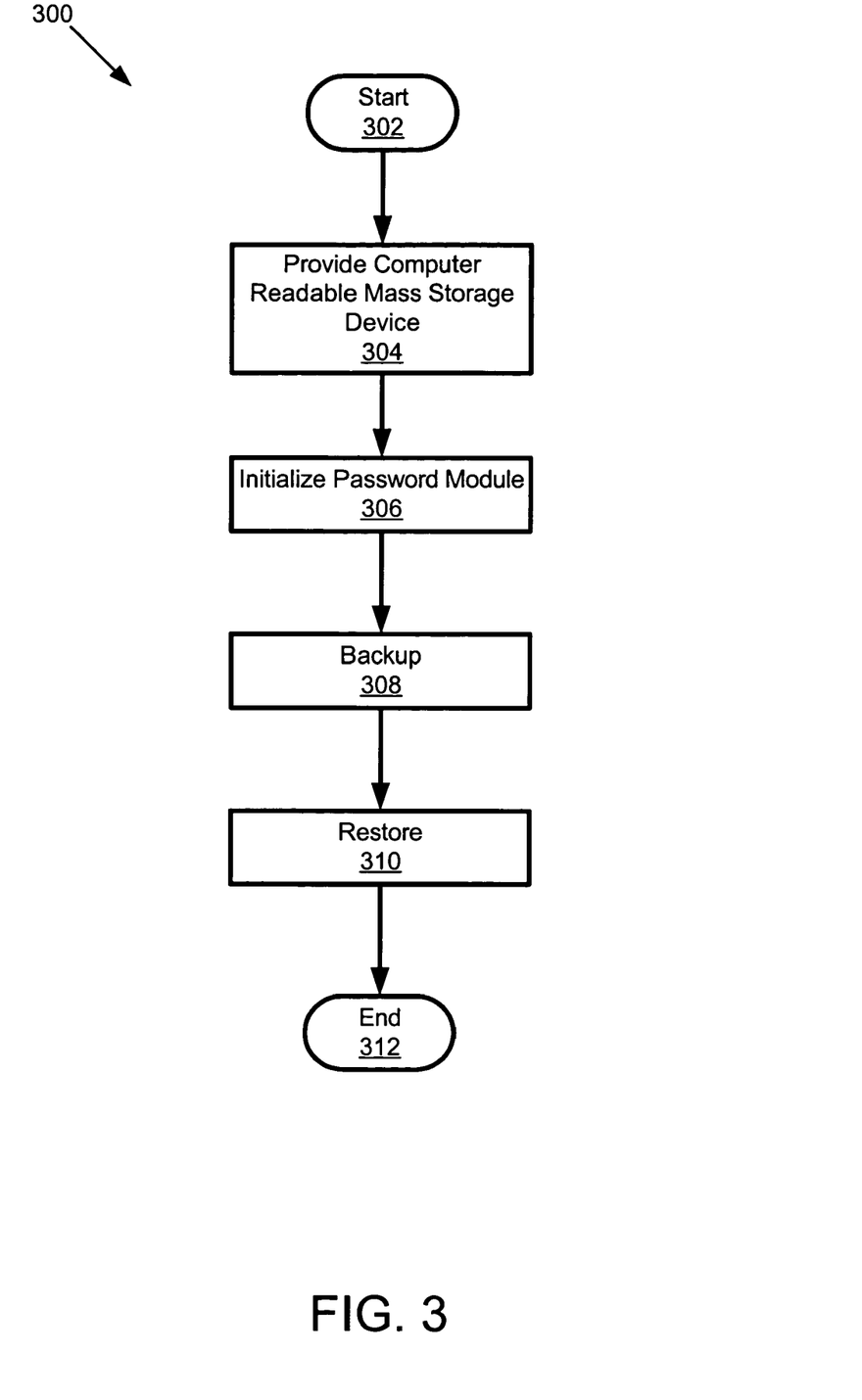
FIG. 3 is a schematic flow chart diagram illustrating one embodiment of a method for use of a secure mass storage backup system in accordance with the present invention.

FIG. 3 is a schematic flow chart diagram illustrating one embodiment of a method 300 for secure mass storage backup in accordance with the present invention. The method 300 starts 302 and a computer readable mass storage device 25 is provided 304 with a first accessible portion 202 and a second encrypted (or lockable) portion 204. The method then initializes 306 the password, creates 308 a backup, and restores 310 the backup if necessary at which point the method 300 ends.

Figure 4:
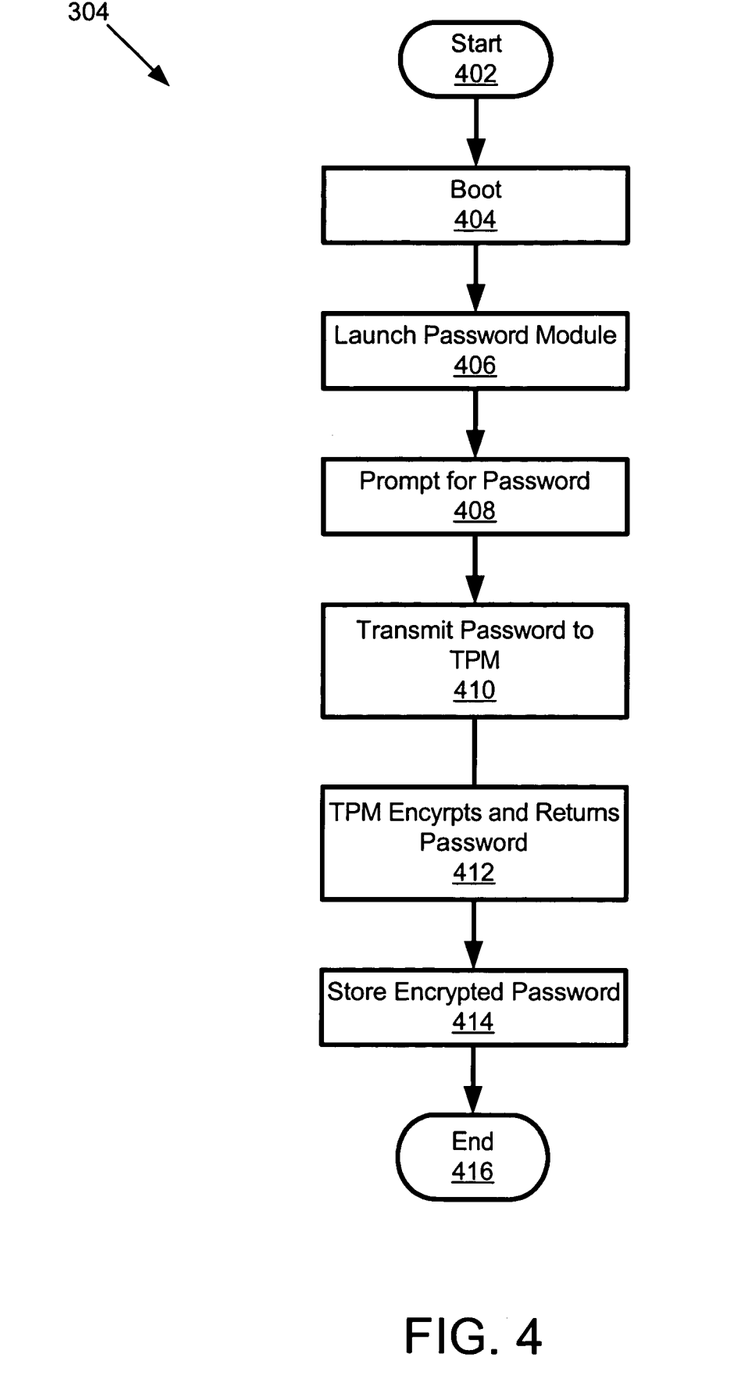
FIG. 4 is a schematic flow chart diagram illustrating one embodiment of a method for initializing a password within the mass storage device in accordance with the present invention.

FIG. 4 is a schematic flow chart diagram illustrating one embodiment of a method 306 for initializing the mass storage device 25 of the present invention. The method 306 starts 402 and the system 10 is booted 404. In one embodiment, booting 404 the system 100 comprises coupling the mass storage device 25 to the system 10, and booting 404 the operating system 206 as described with reference to FIGS. 1 and 2. The first time the mass storage device 25 is booted, the operating system 206 may be configured to detect and automatically launch 406 the password module 210. The password module 210 prompts 408 a user for a password and then the TPI module 208 transmits 410 the password to the TPM 44. The password is encrypted and returned 412 by the TPM 44, at which point the password module 210 stores 414 the encrypted password. The method 306 then ends 416.

Once initialized, the mass storage device 25 maybe booted on any system, but the encrypted portion 204 is only viewable on the system 10 that initialized the password. Beneficially, once initialized no user interaction is required to authenticate and decrypt the encrypted portion 204. Additionally, a user may configure the password module 210 to store multiple encrypted passwords for use on multiple systems. The user must enter the same initialization password for each system initialized.

Figure 5:
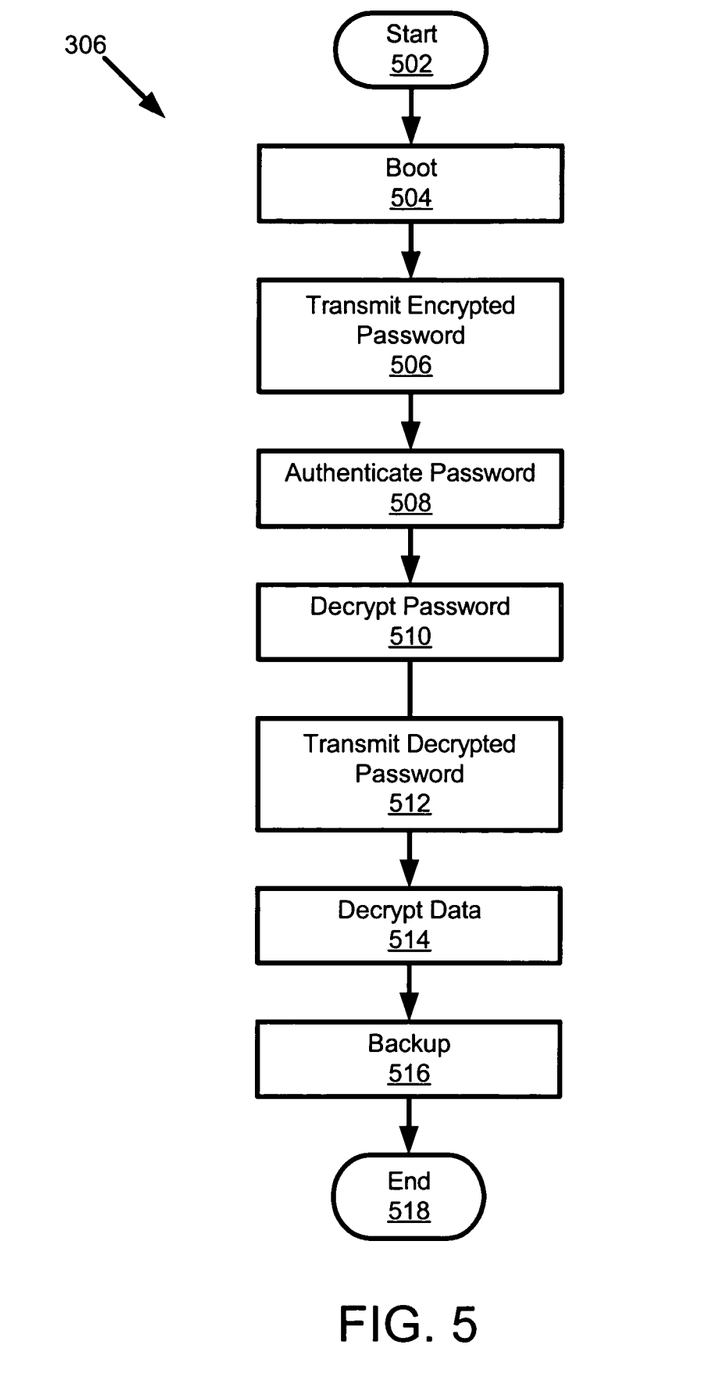
FIG. 5 is a schematic flow chart diagram illustrating one embodiment of a method for backing up data in accordance with the present invention.

FIG. 5 is a schematic flow chart diagram illustrating one embodiment of a method 308 for backing up data utilizing the TPM 44 of the present invention. The method 308 starts 502 and the system 10 is booted 504. The operating system 206 launches the TPI module 208 which transmits 506 the encrypted password. The TPM 44 receives the encrypted password and authenticates 508 the encrypted password. As described above, authenticating the password may comprise comparing the values of the PCRs 48 to a precalculated value and only decrypting the password if the PCRs match the expected value. If authenticated 508, the TPM 44 decrypts 510 the password and transmits 512 the decrypted password to the TPI module 208.

Subsequently, the password module 210 receives the decrypted password and either decrypts 514 the encrypted portion 204 or unlocks the locked partition which contains the backup data. The password module 210 makes the portion 204 available to the operating system 202. Once available, the backup utility module 212 may then proceed to backup 516 data stored on the system 10. The backup process may be automatic or a user may specify the data to be copied. In one embodiment, the backup method 308 may be automated. For example, the user couples the mass storage device 25 to the system 10 and powers on the system 10. The system 10 boots to the mass storage device 25, and the operating system 206 takes control, automatically transmitting the encrypted password, decrypting the encrypted portion 204, backing up the data, and subsequently powering down the system.

Figure 6:
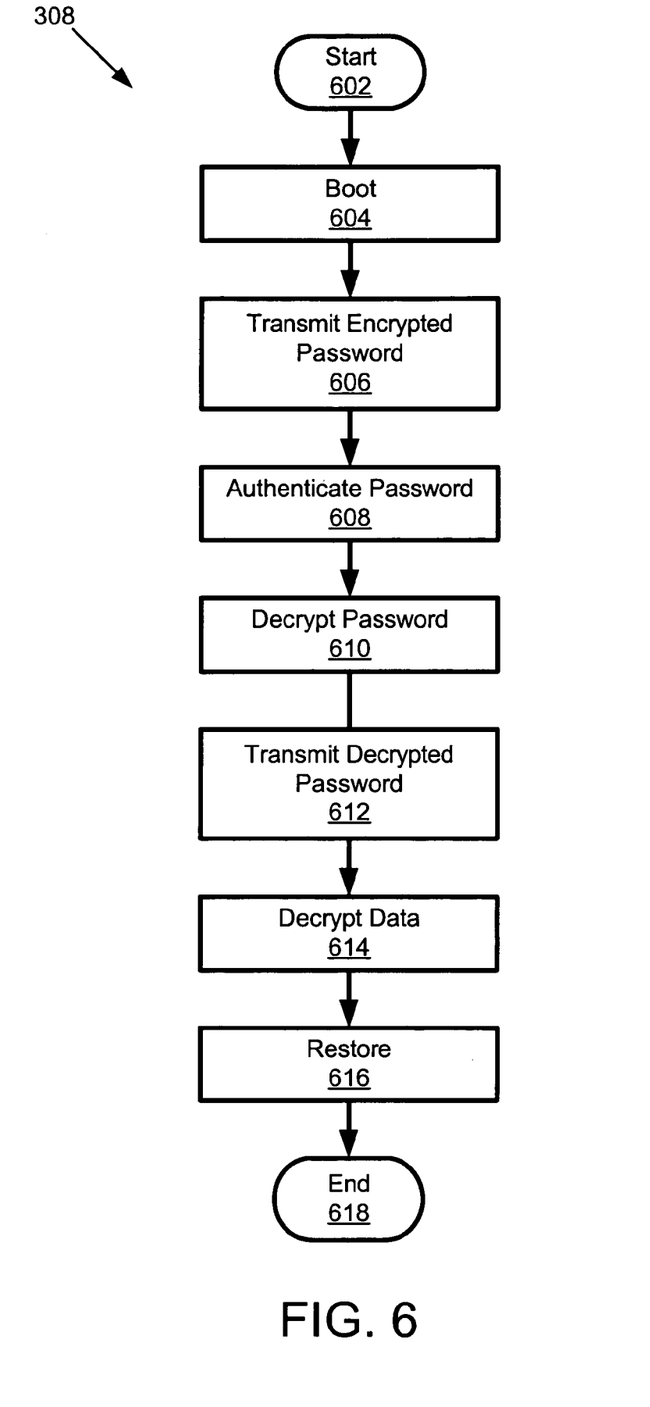
FIG. 6 is a schematic flow chart diagram illustrating one embodiment of a method for restoring data in accordance with the present invention.

Referring now to FIG. 6, shown therein is a method 310 for restoring data from the mass storage device 25 according to the present invention. The method 310 for restoring data starts 602 and similarly boots 604, transmits 606 the encrypted password. The TPM 44 authenticates 608 the encrypted password, and decrypts 610 the password. The TPM 44 then transmits 612 the decrypted password, and the password module 210 decrypts 614 or unlocks the encrypted portion 204. The backup utility module 212 may then restore 616 data to the system 10 that may have suffered a failure. The method 310 then ends 618.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for secure computer readable medium backup, the apparatus comprising:
a computer readable medium having at least a first accessible portion and a second encrypted portion; and
a trusted platform interface module operatively coupled with the computer readable medium and configured to communicate with a cryptographic module, wherein the trusted platform interface module comprises a password module, the trusted platform interface module initializing the password module in response to verifying the cryptographic module by comparing a known value stored on the password module to a cryptographic module platform configuration register value storing a hash of POST BIOS code, wherein only the cryptographic module may initialize the password module, the password module configured to store and transmit an encrypted password to the cryptographic module, and receive an unencrypted password from the cryptographic module.

2. The apparatus of claim 1, wherein the cryptographic module comprises a trusted platform module (TPM).

3. The apparatus of claim 1, wherein the computer readable medium comprises a computer readable peripheral selected from the group consisting of a hard disk drive, a universal serial bus storage device, a floppy disk, an optical storage disk, a flash memory storage device, and a network attached storage drive.

4. The apparatus of claim 1, wherein the encrypted password comprises a unique password configured to be decrypted by the cryptographic module that first created the encrypted password.

5. The apparatus of claim 1, wherein the computer readable medium module further comprises a backup utility module configured to selectively copy data from a storage device source, detect newer versions of data stored on the storage device source, and replace older versions of the data on the computer readable medium with newer versions of the data.

6. A device for secure computer readable medium backup, the device comprising:
a motherboard;
a cryptographic module coupled to the motherboard and configured to communicate with a computer readable medium; and
the computer readable medium comprising a trusted platform interface module configured to communicate with the cryptographic module, wherein the trusted platform interface module comprises a password module, the trusted platform interface module initializing the password module in response to verifying the cryptographic module by comparing a known value stored on the password module to a cryptographic module platform configuration register value storing a hash of POST BIOS code, wherein only the cryptographic module may initialize the password module, the password module configured to store and transmit an encrypted password to the cryptographic module, and receive an unencrypted password from the cryptographic module.

7. The device of claim 6, wherein the cryptographic module is configured to receive the encrypted password from trusted platform interface module, decrypt the password, and transmit the decrypted password to the trusted platform interface module.

8. The device of claim 6, wherein the cryptographic module comprises a TPM.

9. The device of claim 6, wherein the motherboard further comprises a memory and a processor coupled to the memory.

10. The apparatus of claim 6, wherein the computer readable medium comprises a computer readable peripheral selected from the group consisting of a hard disk drive, a universal serial bus storage device, a floppy disk, an optical storage disk, a flash memory storage device, and a network attached storage drive.

11. A system for secure computer readable medium backup, the system comprising:
 a motherboard;
 a cryptographic module coupled to the motherboard configured to decrypt encrypted passwords;
 a computer readable medium module having at least a first accessible portion and a second encrypted portion; and
 a trusted platform interface module operatively coupled with the computer readable media module and configured to communicate with the cryptographic module, wherein the trusted platform interface module comprises a password module, the trusted platform interface module initializing the password module in response to verifying the cryptographic module by comparing a known value stored on the password module to a cryptographic module platform configuration register value storing a hash of POST BIOS code, wherein only the cryptographic module may initialize the password module, the password module configured to store and transmit an encrypted password to the cryptographic module, and receive an unencrypted password from the cryptographic module.

12. The system of claim 11, wherein the encrypted password is configured to be decrypted by the cryptographic module that first created the encrypted password.

13. The apparatus of claim 11, wherein the computer readable medium further comprises a backup utility configured to selectively copy data from a storage device source, detect newer versions of data stored on the storage device source, and replace older versions of the data on the computer readable medium module with newer versions of the data.

14. A computer readable storage medium comprising computer readable code configured to carry out a method for secure computer readable medium backup, the method comprising:
 providing a computer readable medium having at least a first accessible portion and a second encrypted portion;
 initializing a password module in response to a cryptographic module by comparing a known value stored on the password module to a cryptographic module platform configuration register value storing a hash of POST BIOS code, wherein only the cryptographic module may initialize the password module;
 transmitting an encrypted password to the cryptographic module;
 authenticating the encrypted password;
 decrypting the encrypted password;
 transmitting the decrypted password to the computer readable medium module; and
 decrypting the second encrypted portion using the decrypted password.

15. The computer readable storage medium of claim 14, wherein the method further comprises copying data from a source storage device, and storing the data in the second encrypted portion of the computer readable medium.

16. The computer readable storage medium of claim 14, wherein the method further comprises restoring data to the source storage device from the computer readable medium.

17. The computer readable storage medium of claim 14, wherein the method further comprises storing and transporting data in the accessible portion of the computer readable medium.

18. A method for secure computer readable medium backup, the method comprising:
 providing a computer readable medium having at least a first accessible portion and a second encrypted portion;
 initializing a password module in response to verifying a cryptographic module by comparing a known value stored on the password module to a cryptographic module platform configuration register value storing a hash of POST BIOS code, wherein only the cryptographic module may initialize the password module;
 transmitting an encrypted password to the cryptographic module;
 authenticating the encrypted password;
 decrypting the encrypted password;
 transmitting the decrypted password to the computer readable medium; and
 decrypting the second encrypted portion using the decrypted password.

19. The method of claim 18, further comprising copying data from a source storage device, and storing the data in the second encrypted portion of the computer readable medium.

20. The method of claim 18, further comprising restoring data to the source storage device from the computer readable medium.

21. The method of claim 18, further comprising storing and transporting data in the accessible portion of the computer readable medium.

22. An apparatus for secure computer readable medium backup, the apparatus comprising:
 means for providing a computer readable medium having at least a first accessible portion and a second encrypted portion;
 means for initializing a password module in response to verifying a cryptographic module by comparing a known value stored on the password module to a cryptographic module platform configuration register value storing a hash of POST BIOS code, wherein only the cryptographic module may initialize the password module;
 means for transmitting an encrypted password to the cryptographic module;
 means for authenticating the encrypted password;
 means for decrypting the encrypted password;
 means for transmitting the decrypted password to the computer readable medium module; and
 means for decrypting the second encrypted portion using the decrypted password.

23. The apparatus of claim 22, further comprising means for copying data from a source storage device, and storing the data in the second encrypted portion of the computer readable medium.

24. The apparatus of claim 22, further comprising restoring data to the source storage device from the computer readable medium.

* * * * *